June 24, 1941. W. H. BURNHAM, JR 2,246,719
IRON
Filed May 27, 1940
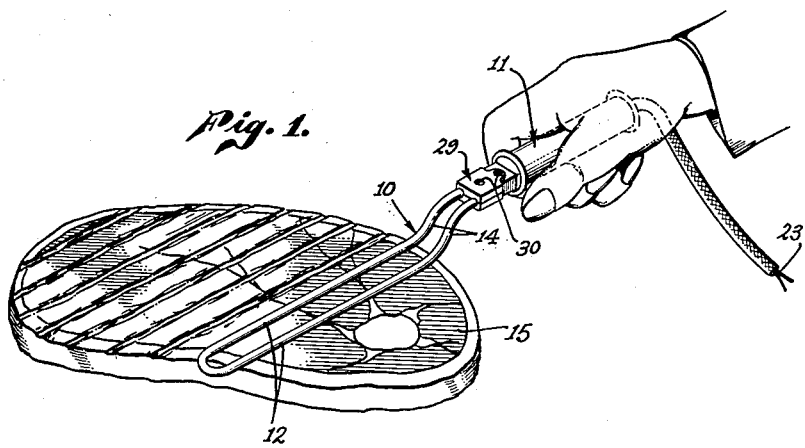
Fig. 1.
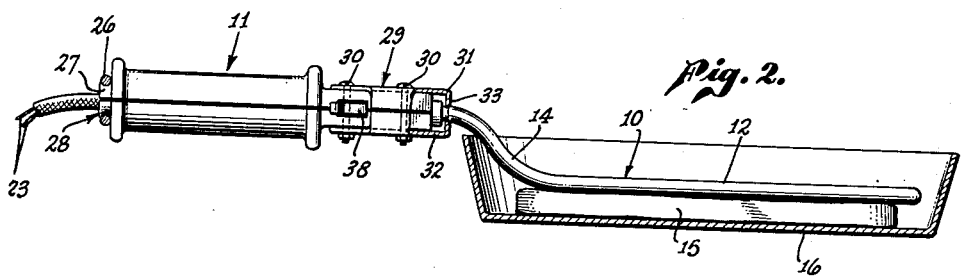
Fig. 2.
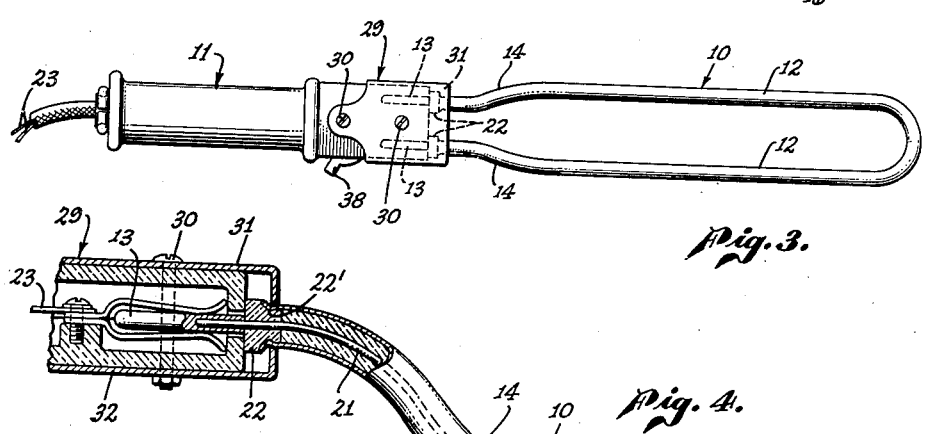
Fig. 3.
Fig. 4.
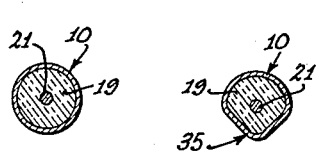
Fig. 5. Fig. 6.
Inventor
WILLIAM H. BURNHAM JR.,
By [signature]
Attorney Patented June 24, 1941

2,246,719

UNITED STATES PATENT OFFICE 2,246,719

IRON

William H. Burnham, Jr., Pebble Beach, Calif.

Application May 27, 1940, Serial No. 337,465

2 Claims. (Cl. 219—29)

This invention relates generally to the cooking utensil art and more particularly consists of a device for giving the appearance to a steak or other meat of having been cooked by broiling.

In preparing food one requisite is to have the food properly cooked and the other requisite, which is almost as important as the first, is to give the food a delectable appearance. It is the appearance of the food which creates first impressions on the diner. This first impression received by the diner is very important psychologically and may greatly contribute or detract from the enjoyment of the food. Broiled meat, such as steaks and chops are particularly pleasing in appearance and are recognized as having a distinct and individual flavor, the result of the broiling operation. This creates a favorable impression on the diner and stimulates his appetite.

It happens that in many instances, both in homes and restaurants, no proper provision is made for broiling meats with the consequence that steaks and the like are fried either in a pan or upon a flat plate on the top of a stove. The present invention is particularly designed for use under the circumstances just noted, that is, where a steak, chop, or other cut of meat is fried. It is an object of this invention to provide a simple means whereby such fried steaks or cuts of meat may be improved in appearance by being given the appearance of a steak that had been broiled in a charcoal or other broiler. It is also an object to provide means to improve the flavor of the meat. These objects are accomplished by the use of what I have termed an iron shown and described in the accompanying drawing and specification.

Referring to the drawing, which is for illustrative purposes only—

Fig. 1 is a perspective view of a device embodying a form of my invention showing the manner of application of the same to a steak;

Fig. 2 is a side elevation partly in section of the device shown in Fig. 1;

Fig. 3 is a plan view of the device shown in the preceding figures;

Fig. 4 is a fragmentary enlarged side elevation partly in section of a portion of the device;

Fig. 5 is a sectional view on line 5—5 of Fig. 4; and

Fig. 6 is a sectional view similar to Fig. 5 showing a modified form of the iron.

More particularly describing the invention, reference numeral 10 generally indicates an elongated searing element which is mounted within a handle 11. The searing element 10 is generally U-shaped having a flat major portion 12 including an outer closed end portion. The element 10 terminates at its inner end in a pair of terminals 13 which are disposed in a plane spaced from the plane of the major portion 12 and are respectively connected to the major portion by intermediate curved portions 14. With this construction, when the iron is held in a horizontal position as shown in Fig. 2, the handle is elevated with relation to the major portion 12 of the searing element thereby facilitating the use of the instrument on a piece of meat 15 in a pan 16 or the like. The searing element 10 is electrically heated and while it may be made in several forms commonly used for making electrically heated elements, the member as shown is made of what is known to the trade as "Calrod." This rod consists of a refractory metal case or sheath 17 which encloses a resistor element such as a nichrome wire 18 embedded in an electric insulating material such as magnesium oxide indicated at 19. The inner ends of the wire 18, as shown in Fig. 4, are connected at 20 respectively to conductor wires 21. Each of these wires 21 extends through a porcelain plug 22 into the respective terminals 13. The porcelain plug 22 is provided with a groove 22' into which the inner ends of the case 17 are crimped as shown in Fig. 4.

With this construction only the major portion 12 of the searing element 10 becomes heated as the resistor wire 18 terminates at the points 20 as heretofore described. As a result the portions 14 never get very hot and the terminals 13 remain cool.

The terminals 13 are connected to wires 23 which may lead to any suitable source of electricity for supplying current to the iron. The terminal and wire connections are housed in the handle 11 which is of split construction and formed in two parts as shown in Fig. 2, the parts being held together at their outer ends by means of a split ring 26 which fits into a groove 27 formed in the two halves of a flange 28 on the ends of the two parts forming the handle. At the other end of the handle a metal casing 29 or reinforcing member is employed, the securing means for such casing consisting of screws or bolts 30 which extend through the casing and through the two parts of the handle extending thereinto. The casing 29 is also made in two parts 31 and 32 which extend beyond the end of the handle and are provided with flanges 33 extending toward each other and engaging the ends of the searing member 10 which extend therethrough in the region of the groove 22'. These flanges form a brace for the iron and also serve to keep the iron connected to the handle.

The searing element 10 is circular in cross section as shown in Fig. 5, but as an alternate form and one which may be more desirable in some cases I prefer to make the underface of the iron V-shaped as indicated at 35 in Fig. 6.

The iron, above described, is used in the following manner: The wires 23 are connected to a source of electric energy and the iron brought to a sufficiently high temperature to sear a steak or other meat. After the steak has been fried or otherwise cooked, the iron is held, as shown in Fig. 1, by gripping the handle and the hot iron brought into contact with the steak. The heat from the iron sears and to some extent chars the meat at the point of contact, so that the steak has the general appearance of a broiled steak, it being understood that the iron is successively applied to different portions of the steak until the whole steak has been given the appearance of having been broiled.

The electric connections in the handle may be of any form commonly used for such purposes and a switch generally indicated at 38 may be provided so that the operator may control the heating of the iron at the handle.

I have found that by marking a steak by searing the surface, as above described, the appearance and taste of a steak actually broiled in the usual manner is thus reproduced by this operation. Insofar as meats are concerned the use of the iron is for the purpose of simulating charcoal broiled meat and I have found that it not only improves meats which have been broiled in the general run of gas or electric heaters incorporated in the average domestic range, but that it can be used with good results on fish, fowl and other forms of cooked products and desserts, as for instance, French pancakes which being rolled and dipped in powdered sugar the iron gives a distinctive burnt sugar flavor to the product.

From the above description it will appear that the iron as described herein becomes a valuable adjunct in the culinary art and although a preferred form of the invention has been particularly shown and described it is contemplated that various changes and modifications might be made without departing from the scope of the invention and it is intended to cover such changes as come within the claims.

I claim as my invention:

1. An electric iron comprising: a handle; an elongated U-shaped searing element formed of a composite rod circular in cross section, said searing element having a major portion disposed in one plane, having terminals disposed in a plane parallel to the plane of said major portion and mounted in said handle, and having converging and curved intermediate portions connecting the respective terminals with the major portion; a resistor in the major portion of said searing element; electrical conductor means extending through said handle and said searing element and connected to said resistor including a switch; and means for connecting said electrical conductor means to a source of electricity.

2. An electric iron comprising: a handle; an elongated searing element having a major portion disposed in one plane, having terminals disposed in a plane parallel to the plane of said major portion and mounted in said handle, and having converging and curved intermediate portions connecting the respective terminals with the major portion, said searing element being formed of a composite rod having a V-shaped undersurface in the region of said major portion; a resistor in the major portion of said searing element; electrical conductor means extending through said handle and said searing element and connected to said resistor including a switch; and means for connecting said electrical conductor means to a source of electricity.

WILLIAM H. BURNHAM, Jr.